United States Patent [19]
Simmons

[11] 3,738,153
[45] June 12, 1973

[54] VALVELESS PROVER
[75] Inventor: C. R. Simmons, Pasadena, Tex.
[73] Assignee: Helmerich & Payne, Inc., Houston, Tex.
[22] Filed: Aug. 24, 1971
[21] Appl. No.: 174,458

Related U.S. Application Data
[63] Continuation-in-part of Ser. No. 81,821, Oct. 19, 1970.

[52] U.S. Cl. .................................................. 73/3
[51] Int. Cl. .............................................. G01f 25/00
[58] Field of Search .................... 73/3; 137/268; 15/104.06 A

[56] References Cited
UNITED STATES PATENTS

| | | | |
|---|---|---|---|
| 1,022,865 | 4/1912 | Nicolai................................ 340/242 |
| 2,977,617 | 4/1961 | Willis........................... 15/104.06 A |
| 3,220,432 | 11/1965 | Allen .......................................... 73/3 |
| 3,246,666 | 4/1966 | Park et al. ................................ 73/3 |
| 3,295,357 | 1/1967 | Halpine..................................... 73/3 |
| 3,504,523 | 4/1970 | Layhe ....................................... 73/3 |
| 3,541,837 | 11/1970 | Davis ........................................ 73/3 |
| 3,638,475 | 2/1972 | Grove ....................................... 73/3 |

FOREIGN PATENTS OR APPLICATIONS

| | | | |
|---|---|---|---|
| 1,104,736 | 2/1968 | Great Britain........................... 73/3 |
| 1,161,700 | 8/1969 | Great Britain........................... 73/3 |
| 1,201,762 | 9/1970 | Great Britain........................... 73/3 |
| 1,203,735 | 8/1970 | Great Britain........................... 73/3 |

*Primary Examiner*—S. Clement Swisher
*Attorney*—Ned L. Conley and Murray Robinson

[57] ABSTRACT

A continuous loop meter prover wherein a hydraulic cylinder operates a poppet valve which is used to force a sphere from the low pressure side to the high pressure side, the poppet valve closing off flow from the high pressure side to the low pressure side when there is no sphere in the interchange, and providing a block and a bleed seal.

13 Claims, 9 Drawing Figures

C R Simmons
INVENTOR.

BY

ATTORNEY

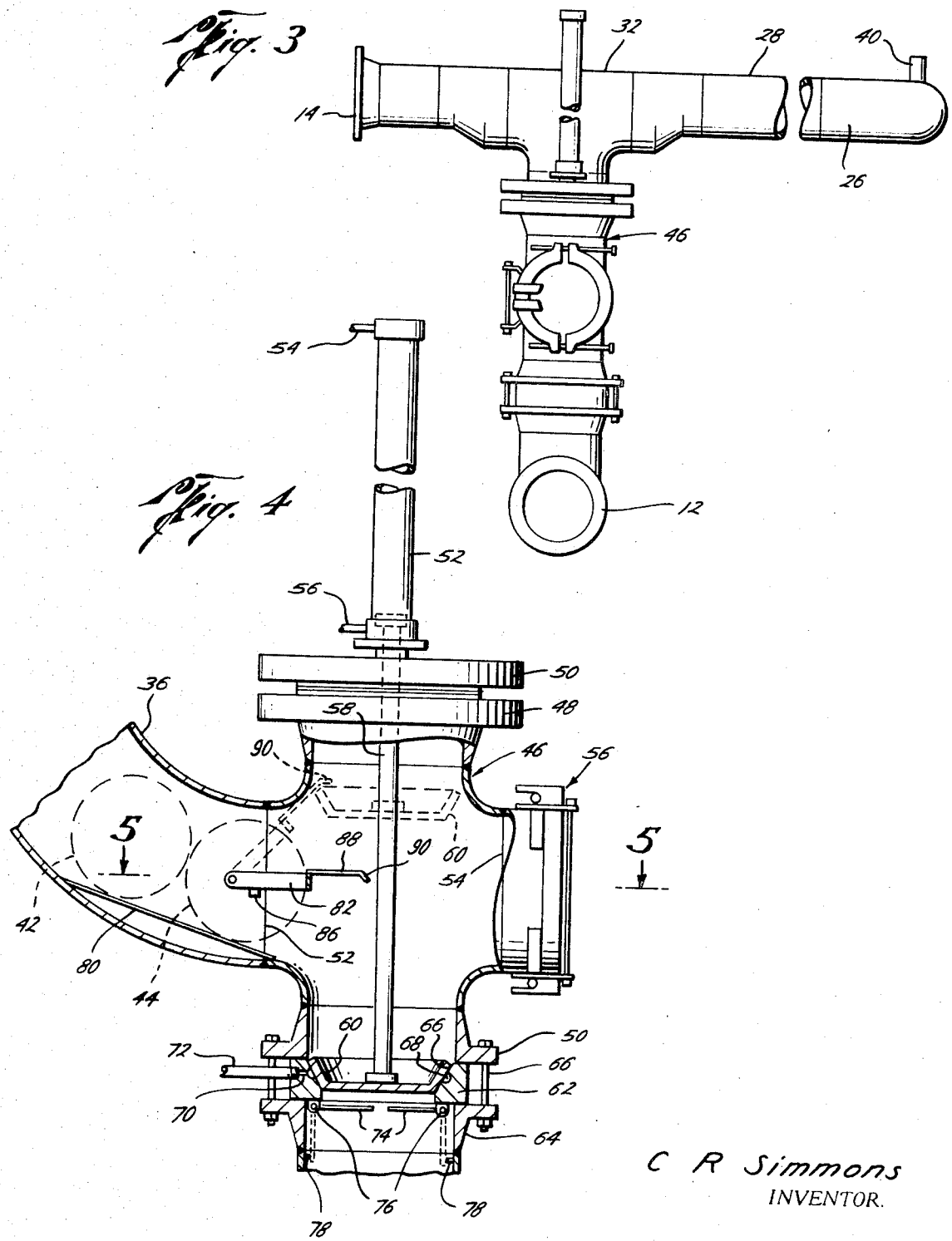

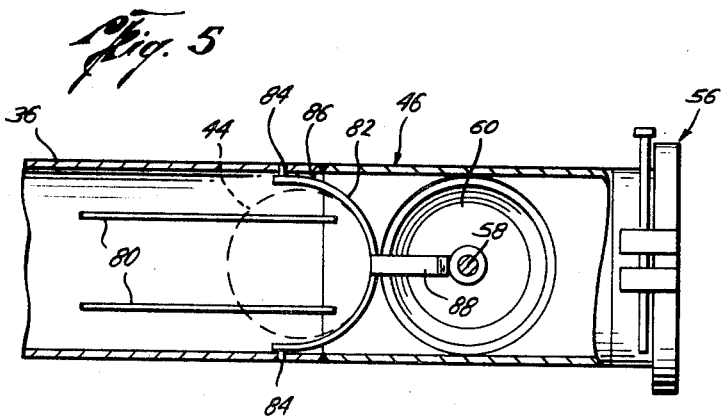
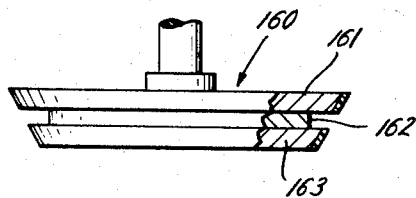
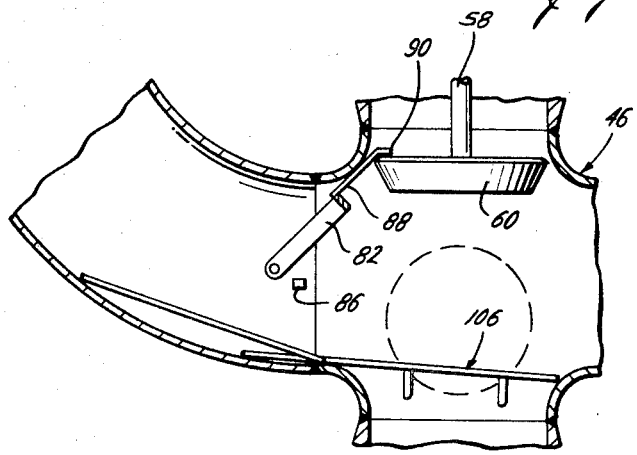
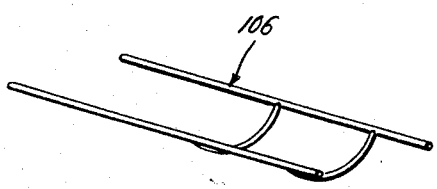
C R Simmons
INVENTOR.

C R Simmons
INVENTOR.

VALVELESS PROVER

REFERENCE TO RELATED APPLICATIONS

This application is a continuation-in-part of application, Ser. No. 81,821, filed Oct. 19, 1970.

BACKGROUND OF THE INVENTION

1. Field of the Invention

This invention relates to the testing, calibrating or proving of flow meters and more particularly relates to improvements in unidirectional flow meters wherein resilient spheres or the like are moved in a continuous loop for the testing of flow meters.

2. Description of the Prior Art

In recent years a technique has been developed for the accurate and economical proving of flow meters, such technique involving the propelling of a solid body, such as a spherical resilient plug, through a given section of a conduit which is arranged in series with a pipeline section containing the flow meter to be proved. The conduit is provided with some means for indicating when the plug moves past an initial switch and a final switch. The volume of the conduit between the initial switch and the final switch is carefully calibrated. By recording the volume flowing through the flow meter during the time it takes the plug to flow the distance between the switches, the meter reading may be checked against the known conduit volume.

A specific system of this type has been described in the Plank et al. U.S. Pat. No. 2,772,561. In this system the liquid being transported through a conduit forces a plug, preferably a sphere made of an elastomeric material which forms a movable seal inside the conduit, through a section of the pipe which constitutes a meter proving section. The flow meter to be calibrated is usually disposed in the conduit, either slightly upstream or downstream of the meter proving section. At the beginning of the meter proving section there is provided an electro-mechanical switch which is tripped by the sphere. This closes a connection between the flow meter and a counter so that the counter is driven by the flow meter. The electrical circuit for this counter remains closed while the sphere continues the course of the proving section of the pipeline until the sphere reaches a position at the end of the section where it trips a second electro-mechanical switch which opens the connection to disconnect the counter from the flow meter. A comparison of this counter's reading with the precalibrated and known displaced volume of the conduit prover section between the two tripping switches provides a calibration of the flow meter.

In order to perform another meter proving run, it was necessary to take the sphere from the end of the proving section in the plank, et al, system and reinsert it at the beginning. Since the liquid pressure in the pipeline at the beginning of the prover section is somewhat greater than the pressure at the end of the prover section, and since it is necessary to avoid any fluid flow between the beginning and end of the prover section except through the precalibrated section, various valving systems have been developed for transfer of the sphere from the end of the prover section to the beginning. Examples of such systems may be found in U.S. Pat. Nos. 2,948,144 to Applequist, 3,224,247 to Barrett, Jr., 3,246,666 to Park, III, et al., 3,220,432 to Allen, 3,387,483 to Van Arsdale, 3,397,570 to Pfrehm, and 3,463,448 to Piccardo. Each of the systems disclosed in these patents comprises a continuous conduit circuit or prover loop which is connected or connectable into the mainstream flow through the pipeline so that all of the fluid flowing through the pipeline flows through the prover loop, at least during the periods when it is desired to calibrate the flow meter. In each of these systems, except Applequist, the main stream may be flowing continuously through the line, and the sphere may be injected into the flowing fluid so that it is carried along with the fluid at the flow rate and a precise calibration of the meter can be obtained.

Various mechanisms have been used to cause the insertion of the sphere. Most commonly in the past some kind of spherical valve, as shown for example in the Barrett, Piccardo and Allen patents, has been used to provide both a seal to prevent flow of fluid from the beginning to the end of the prover loop (except through the calibrated section) and to transfer the sphere from the low pressure side to the high pressure side. Such spherical valves have adequately performed in such systems; however, they have been objectionable to some extent because of their expense and because of maintenance problems. Accordingly, attempts have been made to devise systems which would avoid the problems which have been encountered with spherical valves. One such system is shown in the Pfrehm patent wherein a sphere is used to provide the sealing between the upstream and downstream ends of the prover loop, and a turnstile is used to force the sphere into the prover loop against the pressure differential.

Park, III, disclosed the use of a longitudinally movable piston which has a cavity to receive the sphere for transfer from the downstream to the upstream side of the prover loop.

British Patent Specification 1,166,850, published Oct. 8, 1969, and U.S. Pat. No. 3,504,523 disclose the use of two poppet type valves to close off the ends of the prover loop, one of the poppet type valves being provided with means for transferring the sphere from the downstream to the upstream side of the prover loop.

British Patent Specification No. 1,203,735 published Sept. 3, 1970, shows a similar poppet type valve system where a single poppet valve is used, means being provided on the poppet valve to carry the sphere from the downstream to the upstream end of the prover loop. This patent specification was published less than one year prior to the filing date to which the present application is entitled, and after the conception of the present invention in the United States. In any event, it does not disclose the improvements of the present invention.

Such "valveless" interchanges have not been fully satisfactory however, because, among other reasons, they do not provide any means for determining whether a perfect seal is being maintained between the upstream and downstream sides of the loop during the meter proving operation.

SUMMARY OF THE INVENTION

According to the present invention a positive closure is provided intermediate the upstream and downstream ends of the prover loop during the proving operation, such closure comprising a reciprocable valve member which is movable to a first position to allow a sphere to move into position for injection into the prover loop, and is movable to a second position at which flow is blocked. During movement of the valve from the first position to the second position it forces the sphere into a conduit leading to the inlet to the prover loop. The design of the valve is such that in the second position a continuous check on leakage can be obtained. In a preferred embodiment apparatus is provided for preventing the movement of the sphere into launching position while the valve is in the second position and for automatically releasing the sphere for movement into launching position upon movement of the valve to the first position.

BRIEF DESCRIPTION OF THE DRAWING

FIG. 3 is an elevational view of the right end of the embodiment shown in FIG. 1;

FIG. 4 is a vertical sectional view of the embodiment of FIG. 1, taken at line 4—4 of FIG. 2;

FIG. 5 is a horizontal sectional view of the same embodiment, taken at line 5—5 of FIG. 4;

FIG. 6 is a fragmentary view of another embodiment of the valve member;

FIG. 7 is a vertical sectional view of a portion of the apparatus shown in FIG. 4, at a different stage of the operation;

FIG. 8 is an isometric view of one of the elements shown in FIG. 7; and

DESCRIPTION OF THE PREFERRED EMBODIMENTS

Figure 1:
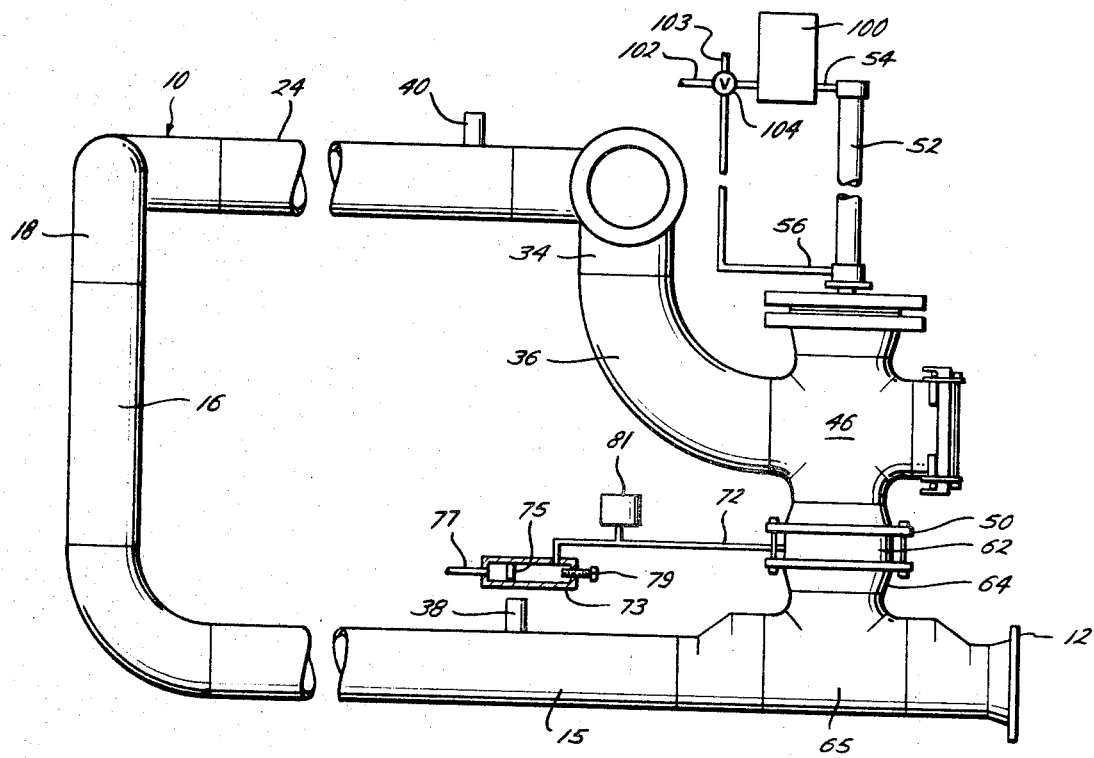
FIG. 1 is an elevational view of one embodiment of a meter prover according to this invention, parts being shown in section and parts being depicted in somewhat schematic form.
Figure 2:
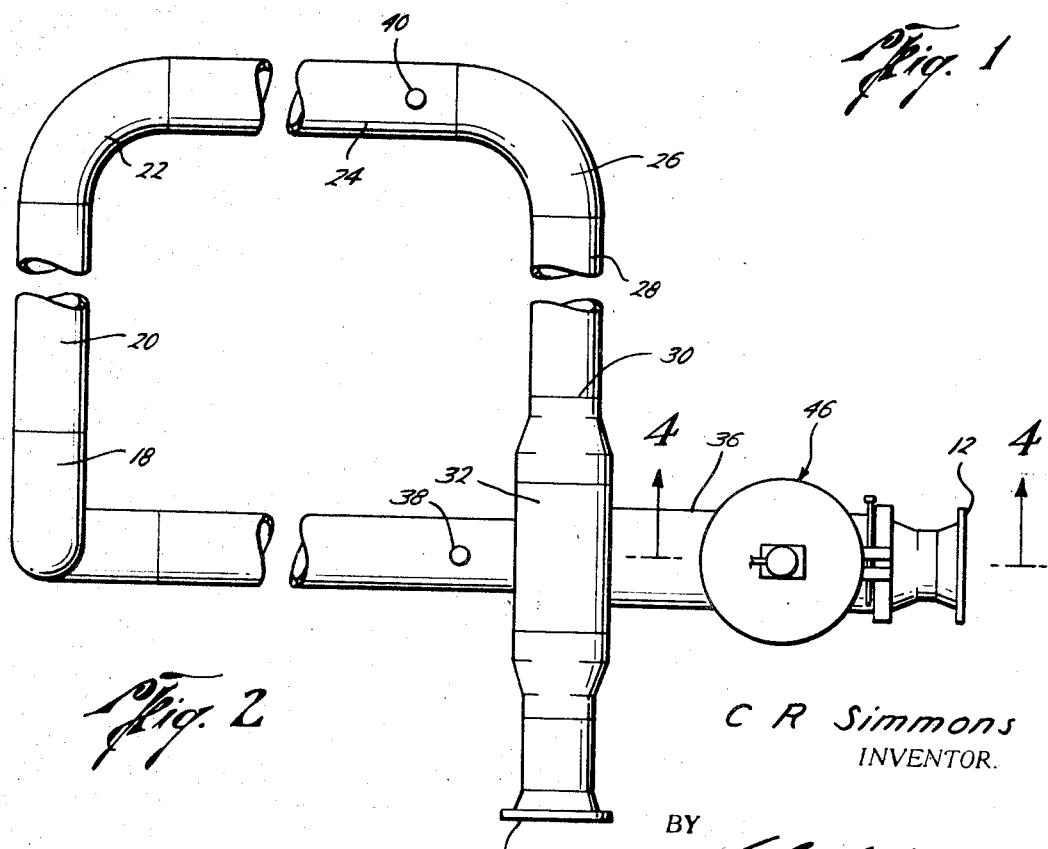
FIG. 2 is a plan view of the embodiment shown in FIG. 1.

In FIGS. 1, 2 and 3 of the drawings, the prover loop 10 is shown with flanged connections 12 and 14 for connecting it into the pipeline which contains the flow meter which is to be calibrated. In the embodiment shown the inlet end 15 of the prover loop is substantially horizontally disposed, and from this horizontal segment the prover loop curves upwardly to form a substantially vertical portion 16. An elbow 18 forms a connection to another horizontal upwardly displaced section 20, another elbow 22 forms a connection to another horizontally disposed section 24, of the prover loop and still another elbow 26 forms a connection to another horizontally disposed section 28, so that in the embodiment shown the prover loop makes a 270° turn, with the outlet or downstream end 30 being vertically displaced above the inlet end 15. Intermediate the outlet end 30 of the prover loop and the flange 14 there is connected a pig separating device 32 which may, for example, be of the type shown in U.S. Pat. No. 3,246,355. In such a device, means are provided for preventing a solid object such as a sphere from being carried horizontally with the liquid flowing into the pipeline connected at flange 14. Such means results in the diversion of the sphere toward the outlet 34 of the pig separating device and down into the curved conduit 36.

The arrangement of the prover loop just described is convenient for many applications of the meter prover of this invention but in some instances it may be desirable to use a different configuration which may, for example, result in a vertical disposition of the pig separator 32, or some other disposition intermediate horizontal and vertical. Such modifications do not detract from the operability of the meter prover of this invention.

In the embodiment shown, switching or signaling devices 38 and 40 are provided to signal the beginning and end of the calibrated portion of the prover loop. Such devices may, for example, be of the type shown in U.S. Pat. No. 3,145,274. As hereinbefore described, the structure, function and operation of these devices are well known to the art.

Looking now at FIG. 4 of the drawing, it will be seen that the curved conduit 36 is connected to guide spheres shown in broken lines at 42 and 44 into the interchange indicated generally at 46. In the embodiment shown, the interchange is in the form of a piping cross provided with upper and lower weld-on flanges 48 and 50, respectively, and horizontally opposed openings 52 and 54, opening 52 being connected, as by welding, to the curved conduit 36 and opening 54 being closed by any convenient closure means 56, preferably of the quick-opening type. Many such devices are known in the art so that a detailed description of a particular device is not necessary herein.

The upper flange 48 has attached thereto a mounting plate 50 upon which is mounted a hydraulic cylinder 52 provided with hydraulic fluid conduits 54 and 56 at its opposite ends, and with a piston rod 58 extending from its lower end through the mounting plate 50 and into the cavity of the interchange. The piston rod has attached to its lower end a conical-shaped piston or poppet valve member which is adapted to be seated within a seat ring 62 secured between the flange 50 and a flange 64 by means of bolts 66. In the embodiment shown, the seat ring 62 is provided with an inner tapered surface 64 having substantially the same taper as the piston 60 so as to provide a seat therefor. The smallest diameter of the seat taper is preferably slightly smaller, e.g. 2 to 5 percent, than the diameter of the sphere to be used. Intermediate the upper and lower ends of the tapered surface 66 is a circumferential groove 68. A radial passageway 70 from the groove to the exterior of the seat ring is adapted to receive a pipe 72, extending externally of the seat ring.

Pipe 72 leads to one end of a cylinder 73, which contains a free piston 75. The other end of the cylinder is connected to a hydraulic line 77. At the first end of the cylinder an adjustable stop 79 is provided. A pressure switch 81 is mounted on the line 72, and is set to provide a light or other signal when the pressure in line 72 exceeds a preset amount.

FIG. 6 depicts a modified form of valve member 160 which is made of a plurality of plates 161, 162, and 163, plates 161 and 163 being beveled to form the tapered surface of the valve member, and plate 162 being reduced in diameter to form a circumferential groove around the valve member. The circumferential surfaces of plates 161 and 163 are coated with a resilient material to cause them to provide a good seal fit with the seat ring. With this embodiment of the valve member, the groove 68 in the seat ring may be omitted.

In a preferred embodiment of the invention, the hydraulic system providing the fluid to the hydraulic cylinder 52, as shown in FIG. 1, incorporates a hydraulic accumulator 100 in the hydraulic conduit 54. A valve 104 is placed at the intersection of conduits 54 and 56 to control the flow of hydraulic fluid to and from supply and exhaust conduits 102 and 103.

A back flow barrier comprising two swing check valve members 74 is pivotably attached to the bottom of the seat ring, the swing check members each being attached by means of a pivot pin 76. These swing check members may consist of generally semicircular plates which may be spring biassed to a substantially horizontal position, but are pivotable to a substantial vertical position as shown in broken lines in FIG. 4. A stop member 78 attached to the walls of the conduit below the flange 64 provides a stop to limit the movement of the backflow barrier. The swing check members are sized so as to provide a substantial restriction to flow upwardly through the seat, but need not fully shut off communication. Because of the pressure drop through the prover loop the fluid pressure at the end of the prover loop is slightly less than at the beginning, so that there is some tendency for liquid to flow from the beginning of the prover loop up through the interchange. The backflow barrier is sized to keep this flow rate low enough that it will not prevent a sphere from falling into the seat ring.

The flange 64 is connected, as by welding, to a sphere injection member 65 which is connected between the inlet flange 12 and the inlet 15 to the prover loop. This sphere injection member is designed to insure that the sphere is readily moved into the beginning of the prover loop, and may, for example, be of the type shown in Canadian Patent No. 703,609.

The lower surface of the curved conduit 36 is provided with a plurality of longitudinally extending bars 80 which slope downwardly toward the cavity of the interchange to provide a track for improved movement of the spheres 42 and 44 into the interchange cavity.

Adjacent the lower end of the curved conduit member 36 a sphere restraining hoop 82 is pivotably attached by means of horizontally extending pivot members 84, the sphere retaining hoop comprising a semicircular member, having a radius somewhat larger than the radius of the spheres, which normally extends substantially horizontally and is supported by stop members 86 on each side. at approximately the center of the restraining hoop, a finger 88 extends radially therefrom, the finger having a downwardly angled tip 90 thereon. The positioning of the restraining hoop and the length of the finger 88 are such that when the piston 60 is in the position shown in broken lines in FIG. 4 the downwardly extending portion 90 of the finger will overhang the piston so as to support the hoop in a raised position. When the piston rod is extended so that the piston 60 is lowered toward the seat ring 62, the restraining hoop is automatically lowered to rest on the stop members 86, thereby being positioned to prevent a sphere from moving from the curved conduit member 36 into the cavity of the interchange.

In operation when it is desired to calibrate a meter, the meter prover is isolated from fluid pressure of the pipeline by an external valve arrangement (not shown). The closure 56 is opened, and a sphere is inserted behind the restraining hoop 82. The closure is then closed, and the valves operated to cause pipeline fluid to flow through the prover loop. Fluid pressure is applied to line 56 of the hydraulic cylinder 52 to lift the piston 60 from the seat. As the piston moves upwardly it engages the finger on the restraining hoop and lifts the restraining hoop far enough to allow the sphere to fall into the interchange cavity and down toward the seat ring. The inner diameter of the seat ring is preferably made slightly smaller, for example, about 2 to 5 percent smaller, than the diameter of the sphere, so that the sphere will not accidentally fall through. It will be seen that up to this time the swing check valve members 74 are in a horizontal position, thereby providing a substantial backflow barrier to minimize the flow of fluid upwardly through the interchange, and allowing the sphere to move downwardly to near the seat.

When it is desired to begin a meter proving run, hydraulic fluid pressure is applied through line 54 to the hydraulic cylinder 52, causing the piston rod 58 and piston 60 to move downwardly, engaging the sphere and forcing it through the seat ring. The sphere then falls through the flange 64 into the sphere injection member 65, there below. The opening through the flange 64 and in the interior of the sphere injection member 65 is substantially larger than the diameter of the sphere so that the sphere will fall freely downwardly, even against fluid flow upwardly through the interchange.

Upon falling into the sphere injection member 65, the velocity of fluid flow therethrough causes the sphere to be moved horizontally into the beginning of the prover loop at 15. The prover loop has a diameter slightly smaller than the sphere diameter, for example 2 to 5 percent smaller, so that the sphere is forced through the prover loop by the moving fluid at the rate of flow of the fluid.

Upon contacting the first signaling device 38 the counter on the flow meter is engaged and upon contacting the second signaling device 40 the counter on the flow meter is disengaged, thereby providing a calibration of the flow meter. The sphere continues to move through the prover loop to the sphere separating device 32 where it falls down into the curved conduit 36 and moves downwardly until it engages the restraining hoop 82, where it is ready for another calibration run.

Having pushed the sphere downwardly through the seat ring, the piston 60 has continued to move downwardly until it engages the tapered seat ring and forms a fluid tight seal. A continuous automatic check of the adequacy of the seal thus formed may be maintained by checking for leakage of fluid through the conduit 72. For example, line 77 may be vented to atmosphere, and leakage into line 72 will cause piston 75 to move to the left, as seen in FIG. 1, until it hits the end of the cylinder. This increases the volume in the closed system between the piston 60 and the piston 75, thereby decreasing the pressure to below line pressure. Then if the seal between the piston 60 and seat 62 leaks, fluid from the meter prover will build up the pressure in line 72 to exceed the preset pressure of pressure switch 81, providing a signal that leakage exists. This system may be reset by applying hydraulic fluid pressure to the left end of the cylinder 73, thereby moving piston 75 to the right. Thus leakage of the prover interchange may be detected without any loss of pipeline fluid to the atmosphere. The adjusting screw 79 may be operated to control the amount of movement allowed for piston 75, thereby controlling the pressure drop resulting from venting line 77.

When it is desired to remove the sphere for replacement, the closure member 56 may be opened, the piston 60 retracted to just below the position at which it engages the finger 88 on the restraining hoop 82, and sphere removal rails 106, which may be of the form depicted in FIGS. 7 and 8, may be inserted into the interchange. Then when the piston is retracted to its uppermost position, moving the restraining hoop upwardly, the sphere will roll toward the open side of the interchange rather than falling down into the seat ring.

Although certain preferred embodiments of this invention have been shown and described herein, many modifications thereof will be apparent to those skilled in the art.

Figure 9:
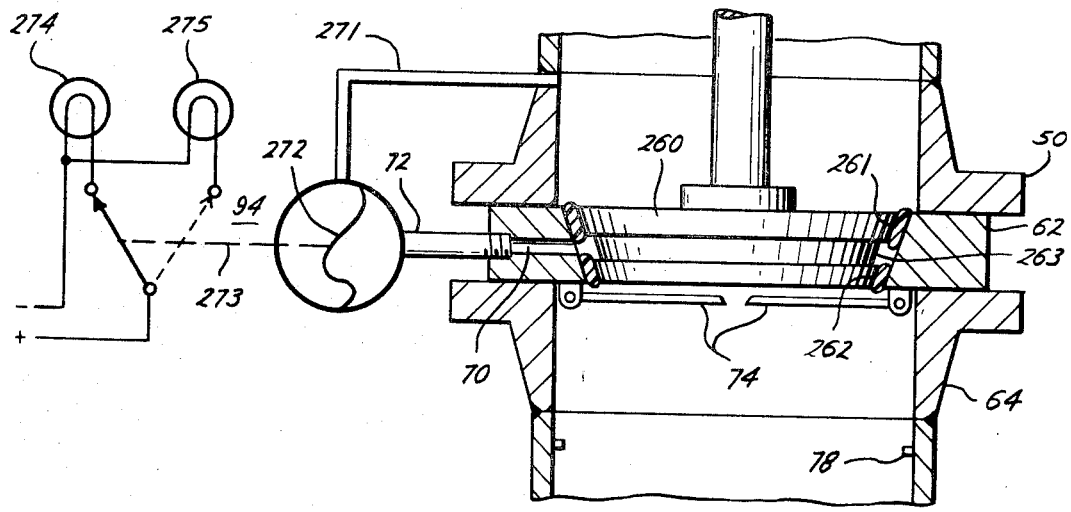
FIG. 9 is a vertical sectional, somewhat schematic view of another embodiment of the invention.

One example of such a modification is shown in FIG. 9, which illustrates a form of the leakage sensing means within the scope of the present invention which was conceived by someone other than the present inventor upon being shown the embodiment shown in FIGS. 1 to 8. In the embodiment shown in FIG. 9 a piston member 260 received within the seat ring 62 is provided with two elastomeric sealing rings 261 and 262 which may, for example, be bonded to the piston. These rings are spaced apart to form an annular groove 263 circumscribing the piston 260 which, when the piston is in position in the seat, is intersected by the passageway 70 to which pipe 72 is connected. A differential pressure switch, such as that indicated diagrammatically at 94, is connected to the pipe 72 and is also connected by means of a pipe 271 to line pressure above the piston 260. As shown, line 72 connects to one side of the diaphragm 272 and line 271 connects to the other side. The plunger 273 of the pressure switch is connected to a Microswitch or the like which, in one position may, for example, turn on a green light 274 and in the other position turn on a red light 275. Such a pressure switch is available on the market from the Static O-ring Pressure Swtch Co. of Kansas City, Missouri. Their explosion proof differential pressure switch number 135—K8 which is operable at a differential pressure of 5 to 50 psi, and which has 3 to 5 psi sensitivity, has been used successfully.

in this embodiment of the invention, when the piston member 270 moves down into the taper of the seat, compression of the resilient seal members 261 and 262 allows the piston to move further down into the seat after a seal has been formed, thereby reducing the volume of the closed system formed between the piston member 260 and the diaphragm 272 of the pressure switch 94. Where a small pressure switch and a relatively short line 72 are used, such movement may increase the pressure in the line 72 by 200 to 400 pounds per square inch above line pressure. Since the other side of the pressure switch is connected to the line, the pressure differential resulting from the increase in pressure over line pressure operates the pressure switch to turn on the green light, in the embodiment shown in the drawing. In actual practice it has been desirable to adjust the pressure switch so that a differential pressure of from 10 to 20 pounds per square inch will be sufficient to turn on the green light. This is enough to prevent minor variations in pressure from actuating the switch accidentally and yet sufficient to provide a positive indication of a pressure increase.

The presence of a green light in this system indicates a "bubble" tight seal, that is, that there is no leakage past the piston. Any leakage past the piston would promptly reduce the pressure in the closed system between the piston 260 and the diaphragm 272, thereby decreasing the differential pressure on the diaphragm and causing the switch to move back to turn on the red light. Due to the small volume of liquid enclosed even a very small leak is readily detected. In operation it has been found satisfactory to set the differential pressure switch so that the green light stays on until the differential pressure has dropped at least 2 to 5 pounds per square inch, so that variations in line pressure will not cause an accidental switching.

Instead of lights other signalling means, such as an audible alarm, can be used. In addition, signals can be local at the meter prover itself or remote at an operating station.

Instead of using seals of elastomer bonded to the piston 260, grooves for O-rings may be provided above and below the groove 263, and the O-rings may provide the necessary compression. It is apparent that many other types of compressible or movable seal members could be used and would be within the scope of the present invention.

For the reasons hereinbefore explained, the invention is not limited to the specific embodiments disclosed and described herein, but only to such embodiments as may be included within the scope of the appended claims.

I claim:

1. In a meter prover comprising a prover loop having an inlet end and an outlet end, first and second sphere signalling devices between said ends, and an interchange to transfer a sphere from the outlet end into the inlet end, the improvement wherein the interchange comprises
   a housing,
   a first opening in said housing for admission of a sphere into said housing,
   a second opening in said housing communicating with the inlet end of said prover loop,
   said second opening including a seat member,
   a resilient sphere movable through said housing, said sphere having a diameter smaller than said second opening,
   an annular constriction in said second opening adjacent said seat member having a diameter smaller than the diameter of said sphere,
   a reciprocable valve member in said housing movable from a first position, spaced far enough away from said seat member to allow the sphere to move between the valve member and the seat member, to a second position sealingly engaging said seat member, and
   means on said housing for moving said valve member from said first position to said second position with sufficient force to force said sphere through said constriction.

2. Apparatus as defined by claim 1, wherein said seat member is provided with a tapered bore, and said valve member is correspondingly tapered to sealingly engage said tapered bore.

3. Apparatus as defined by claim 2, and including a resilient layer intermediate said tapered bore and the valve member taper.

4. A meter prover as defined by claim 1, wherein said means for moving the valve member comprises a hydraulically actuable cylinder having a hydraulic fluid supply line which includes a pressure accumulator, so that when the valve member is moved to said second position a continuous force is applied to hold it in that position.

5. A meter prover as defined by claim 1 and including a resilient sealing element between the valve member and the valve seat, an annular passageway in said sealing element between the valve member and the valve seat, leakage sensing means, and a port intersecting said annular passageway and connected to said leakage sensing means.

6. A meter prover as defined by claim 5 wherein said leakage sensing means comprises fluid operable means including a member therein movable in response to a pressure differential across it, means providing communication between said fluid operable means and the annular passageway whereby leakage past the sealing element causes a change in the pressure differential across said member, and signalling means connected to said fluid operable means adapted to provde a signal in response to a pressure change of a predetermined magnitude.

7. A meter prover as defined by claim 1, and including a back flow barrier adjacent said valve seat movable from a first position providing a substantial restriction to flow through said second opening to a second position allowing movement of a sphere downwardly through said second opening.

8. A meter prover as defined by claim 7 wherein said barrier comprises a swing check resiliently biased toward said first, restricting position, whereby said sphere may fall by gravity from said first opening to said second opening.

9. In a meter prover comprising a prover loop having an inlet end and an outlet end above said inlet end, first and second sphere signalling devices between said ends, and an interchange to transfer spheres from the outlet end into the inlet end, the improvement wherein the interchange comprises a housing, a first opening in said housing for admission of spheres into said housing, a second opening in said housing below said first opening communicating with the inlet end of said prover loop, a seat member in said second opening, a reciprocable valve member in said housing movable from a first position spaced away from said seat member to a second position sealingly engaging said seat member, means on said housing for moving said valve member from said first position to said second position, and a back flow barrier adjacent said seat member movable from a first position providing a substantial restriction to flow through said second opening to a second position allowing movement of a sphere downwardly through said second opening.

10. A meter prover as defined by claim 9, wherein said barrier comprises a swing check resiliently biassed toward said first, restricting position, whereby said sphere may fall by gravity from said first opening to said second opening.

11. In a meter prover comprising a prover loop having an inlet end and an outlet end, a resilient sphere movable through said loop, first and second sphere signalling devices between said ends, and an interchange to transfer spheres from the outlet end into the inlet end, the improvement wherein the interchange comprises a housing, a first opening in said housing for admission of spheres into said housing, a second opening in said housing communicating with the inlet end of said prover loop, a seat member in said second opening, said seat member having a minimum area less than the cross-sectional area of said sphere, a reciprocable valve member in said housing movable from a first position spaced away from said seat member to a second position sealingly engaging said seat member, and means on said housing for moving said valve member from said first position to said second position with sifficient force to force a sphere through said seat member.

12. In a meter prover comprising a prover loop having an inlet end and an outlet end, first and second sphere signalling devices between said ends, and an interchange to transfer spheres from the outlet end into the inlet end, the improvement wherein the interchange comprises a housing, a first opening in said housing for admission of spheres into said housing, a second opening in said housing communicating with the inlet end of said prover loop, a seat member in said second opening, a reciprocable valve member in said housing movable from a first position spaced away from said seat member to a second position sealingly engaging said seat member, means on said housing for moving said valve member from said first position to said second position, and means for maintaining a continuous closing force on said valve member while it is engaged with said seat member.

13. A meter prover as defined by claim 12, and including a hydraulically actuable cylinder to move said valve member, and a hydraulic fluid supply line including a pressure accumulator.

* * * * *